(12) United States Patent
Kim

(10) Patent No.: US 11,132,497 B2
(45) Date of Patent: Sep. 28, 2021

(54) DEVICE AND METHOD FOR INPUTTING CHARACTERS

(71) Applicant: Bonggeun Kim, Seoul (KR)

(72) Inventor: Bonggeun Kim, Seoul (KR)

( * ) Notice: Subject to any disclaimer, the term of this patent is extended or adjusted under 35 U.S.C. 154(b) by 0 days.

(21) Appl. No.: 17/047,691

(22) PCT Filed: Jul. 8, 2019

(86) PCT No.: PCT/KR2019/008332
§ 371 (c)(1),
(2) Date: Oct. 15, 2020

(87) PCT Pub. No.: WO2020/080644
PCT Pub. Date: Apr. 23, 2020

(65) Prior Publication Data
US 2021/0103696 A1    Apr. 8, 2021

(30) Foreign Application Priority Data

Oct. 14, 2018  (KR) .................. 10-2018-0122226
Apr. 9, 2019   (KR) .................. 10-2019-0041116

(51) Int. Cl.
*G06F 40/12* (2020.01)
*G06F 3/0488* (2013.01)

(52) U.S. Cl.
CPC .......... *G06F 40/12* (2020.01); *G06F 3/04886* (2013.01); *G06F 2203/04803* (2013.01)

(58) Field of Classification Search
CPC ............. G06F 40/12; G06F 3/04886; G06F 2203/04803
See application file for complete search history.

(56) References Cited

U.S. PATENT DOCUMENTS 10,970,458 B1 *   4/2021   Dhanuka ............... G06F 40/151
2005/0187954 A1 * 8/2005   Raman .................. G06F 16/80
(Continued)

FOREIGN PATENT DOCUMENTS

JP     2014228953 A    12/2014
KR   1020030024154 A    3/2003
(Continued)

OTHER PUBLICATIONS

YouTube video clip "Text to Emoji Converter;" uploaded Jul. 10, 2018 by Vasundhara Infotech LLP. Retrieved from Internet: <https://www.youtube.com/watch?v=ImK3M8TKtVU>. 4pp of screenshots included, entire video is relevant as cited. (Year: 2018).*

(Continued)

*Primary Examiner* — Keith D Bloomquist
(74) *Attorney, Agent, or Firm* — Cantor Colburn LLP

(57) ABSTRACT

A method for inputting characters capable of being performed in a device is disclosed. The device is configured to input characters in a text input area that is displayed on the device itself or on an external display device. The method for inputting characters includes receiving, at the device, a key input which corresponds to a language character to be inputted in the text input area, and causing the device to input a plurality of Unicode characters in the text input area in response to the key input, the plurality of Unicode characters representing a shape of the language character over at least two text lines.

20 Claims, 16 Drawing Sheets

(56) References Cited

U.S. PATENT DOCUMENTS

| | | | |
|---|---|---|---|
| 2006/0053386 A1* | 3/2006 | Kuhl | G06F 3/0481 |
| | | | 715/773 |
| 2006/0227153 A1 | 10/2006 | Anwar et al. | |
| 2009/0115797 A1* | 5/2009 | Poupyrev | G06F 3/04845 |
| | | | 345/619 |
| 2011/0055585 A1* | 3/2011 | Lee | H04L 9/0844 |
| | | | 713/183 |
| 2011/0317919 A1* | 12/2011 | Wong | G06T 11/60 |
| | | | 382/168 |
| 2012/0162350 A1* | 6/2012 | Lee | H04L 51/10 |
| | | | 348/14.03 |
| 2012/0304074 A1* | 11/2012 | Ooi | G06F 3/04895 |
| | | | 715/752 |
| 2012/0323564 A1* | 12/2012 | Fujii | H04N 9/8233 |
| | | | 704/9 |
| 2015/0026553 A1* | 1/2015 | Takeuchi | G06F 40/131 |
| | | | 715/211 |
| 2017/0063393 A1* | 3/2017 | Shelton | G06F 21/31 |
| 2018/0253878 A1* | 9/2018 | Jain | G06T 11/60 |

FOREIGN PATENT DOCUMENTS

| | | |
|---|---|---|
| KR | 1020060026538 A | 3/2006 |
| KR | 1020070014646 A | 2/2007 |
| KR | 1020100084487 A | 7/2010 |
| KR | 1020130132588 A | 12/2013 |
| KR | 1020150143711 A | 12/2015 |
| KR | 101582155 B1 | 1/2016 |
| KR | 1020160035441 A | 3/2016 |
| KR | 101646688 B1 | 8/2016 |

OTHER PUBLICATIONS

International Search Report dated Nov. 7, 2019 for PCT/KR2019/008332.

* cited by examiner

DEVICE AND METHOD FOR INPUTTING CHARACTERS

TECHNICAL FIELD

The present invention relates to technology for inputting characters, which causes a device to be used to facilitate inputting characters.

BACKGROUND ART

As mobile devices such as smartphones, tablet computers, etc. are widely used, the amount in messages users communicate on social network services (SNS's) are significantly increasing. Recently, a variety of user interface technologies which may be applied on keyboards of mobile devices have been developed to facilitate inputting a user's message, for example, by altering the key arrangement of a keyboard or by adding emoticons in the key arrangement of a keyboard. In addition, as the number of applications which are used in mobile devices increases, the types of SNS applications are also diversifying.

However, characters which users may input in these SNS applications are typically confined to specific sizes and fonts. For example, the size of a character inputted using a message application is confined to a constant size regardless of the type of the character. Accordingly, it is difficult to emphasize or highlight text by changing the size of a character when inputting the character.

DISCLOSURE

Technical Problem

It is to provide devices and methods for inputting characters, which cause a device to be used to facilitate inputting characters in various sizes or shapes.

Technical Solution

A method for inputting characters according to an embodiment of the present disclosure is a method which may be performed in a device. The device is configured to input characters in a text input area displayed on the device itself, or the device is configured to provide an external display device with characters for inputting in a text input area displayed on the external display device. The method for inputting characters comprises: receiving a first key input, wherein the first key input corresponds to a language character to be inputted in the text input area; and providing, in response to the first key input, a plurality of Unicode characters to be inputted in the text input area, wherein the plurality of Unicode characters represents a shape of the language character over at least two text lines.

In an embodiment, the text input area may be configured so that characters are inputted in a plurality of text lines.

In an embodiment, a text input position for inputting characters may be configured to be displayed in the text input area. The at least two text lines may include at least two text lines of text lines from m-th line above the text input position and to n-th line below the text input position. Here, each of m and n may be an integer equal to or greater than zero, and equal to or less than 50, and the sum of m and n may be equal to or greater than one.

In an embodiment, one of m and n may be zero.

In an embodiment, the at least two text lines may include consecutive text lines.

In an embodiment, after the providing the plurality of Unicode characters, the method may further include: receiving a second key input, wherein the second key input corresponds to a spacing representation; and providing, in response to the second key input, white-space Unicode characters to be inputted in each of the text lines of the at least two text lines in which the plurality of Unicode characters were inputted.

In an embodiment, after the providing the plurality of Unicode characters, the method may further include: receiving a third key input, wherein the third key input corresponds to a deletion representation; and deleting the plurality of Unicode characters in response to the third key input, wherein the plurality of Unicode characters to be deleted were inputted in the at least two text lines in response to the first key input.

In an embodiment, before the providing the plurality of Unicode characters, the method may further include receiving an input of at least one Unicode character to be included in the plurality of Unicode characters representing the shape of the language character.

In an embodiment, the device may include a touch screen. The text input area may be configured to be displayed on the touch screen.

In a computer-readable storage medium according to an embodiment of the present disclosure, computer-executable instructions are stored which may be performed in a device. The device is configured to input characters in a text input area displayed on the device itself, or the device is configured to provide an external display device with characters for inputting in a text input area displayed on the external display device. The computer-executable instructions are configured to provide a plurality of Unicode characters for inputting in the text input area if a first key input is inputted, wherein the first key input corresponds to a language character to be inputted in the text input area, wherein the plurality of Unicode characters represents a shape of the language character over at least two text lines.

In an embodiment, the at least two text lines may include consecutive text lines.

In an embodiment, the text input area may be configured so that characters are inputted in a plurality of text lines.

In an embodiment, a text input position for inputting characters may be configured to be displayed in the text input area. The at least two text lines may include at least one of a first text line in which the text input position is placed, a second text line just above the first text line, and a third text line just below the first text line.

In an embodiment, the computer-executable instructions may be further configured, after the providing the plurality of Unicode characters, to provide white-space Unicode characters to be inputted in each text line of the at least two text lines if a second key input is inputted, wherein the second key input corresponds to a spacing representation.

In an embodiment, the computer-executable instructions may be further configured, after the providing the plurality of Unicode characters, to delete the plurality of Unicode characters if a third key input is inputted, wherein the third key input corresponds to a deletion representation, and wherein the plurality of Unicode characters to be deleted were inputted over the at least two text lines in response to the first key input.

A device for inputting characters according to an embodiment of the present disclosure comprises a display unit configured to display a text input area in which characters may be inputted in a plurality of text lines, a key input unit configured to receive a key input wherein the key input corresponds to a language character to be inputted in the text input area, and a control unit configured to input a plurality of Unicode characters in the text input area in response to the key input, wherein the plurality of Unicode characters represents a shape of the language character over at least two text lines.

In an embodiment, the at least two text lines may include consecutive text lines.

In an embodiment, the display unit may include a touch screen. The key input unit may be configured to be displayed on the touch screen.

In an embodiment, the key input unit may include an arrangement of keys which display characters in a basic multilingual plane of Unicode.

In an embodiment, the key input unit may include an arrangement of keys which display alphabet letters.

Advantageous Effects

In accordance with devices and methods for inputting characters as described in embodiments of the present disclosure, a device may be used to facilitate inputting characters in various sizes or shapes.

BEST MODE

Hereinafter, embodiments of the present disclosure are described in detail with reference to the attached drawings.

Terms used throughout the description may have meanings in nuances suggested or implied in the context beyond explicitly mentioned meanings.

In addition, phrases such as "in an embodiment", "in an exemplary embodiment", or the like used in the description may not necessarily refer to the same embodiment, while phrases such as "in another embodiment", "in another exemplary embodiment", or the like may refer to a different embodiment or may not necessarily refer to a different embodiment.

Terms such as "and", "or", and "and/or" used in the description may include various meanings which may at least partially depend on the context in which they are used.

Terms such as "first", "second", and the like used in the description may refer to various elements regardless of their order and/or importance, and the terms are only used to distinguish one element from another and do not limit those elements. For example, a first element and a second element may refer to different elements regardless of their order and/or importance. For example, without departing from the scope described in the description, the first element may be referred to a second element, and similarly, the second element may be referred to a first element.

In addition, the phrase "one or more" used in the description may be used, at least in part, depending on the context, to describe any feature, structure or property having a single element, or to describe a feature, structure or combination thereof having a plurality of elements.

Furthermore, phrases such as "based on", "in response to" or "responsive to" are not intended to describe an exclusive set of elements, but they are intended to, at least partially, allow the existence of additional elements which are not explicitly described, depending on the context.

Unless stated otherwise, all the technical and scientific terms used in the description have the same meanings as those generally understood by one skilled in the art.

Figure 1:
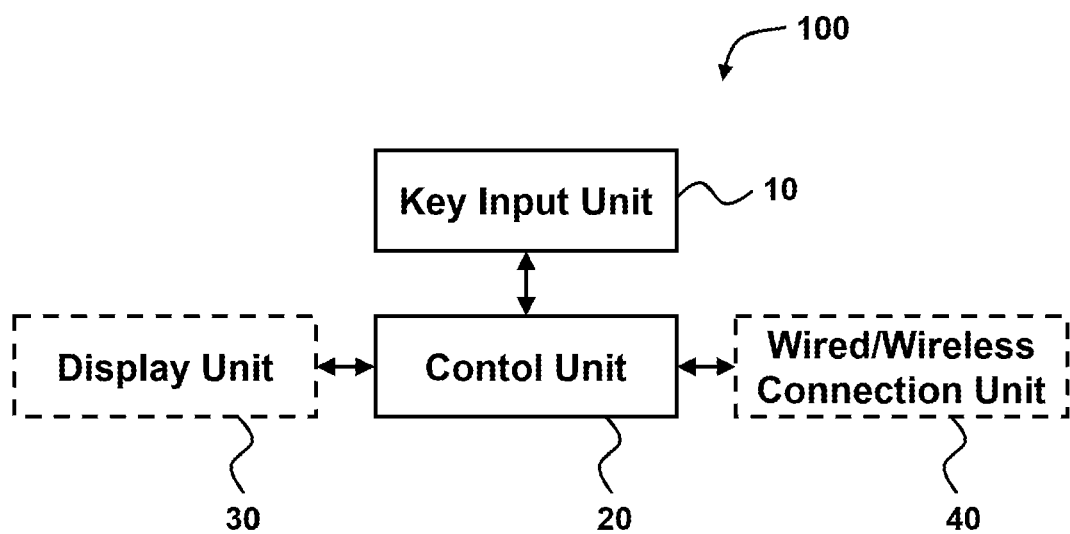
FIG. 1 is a block diagram illustrating the configuration of a device in which technologies for inputting characters may be implemented according to embodiments of the present disclosure.
Figure 2:
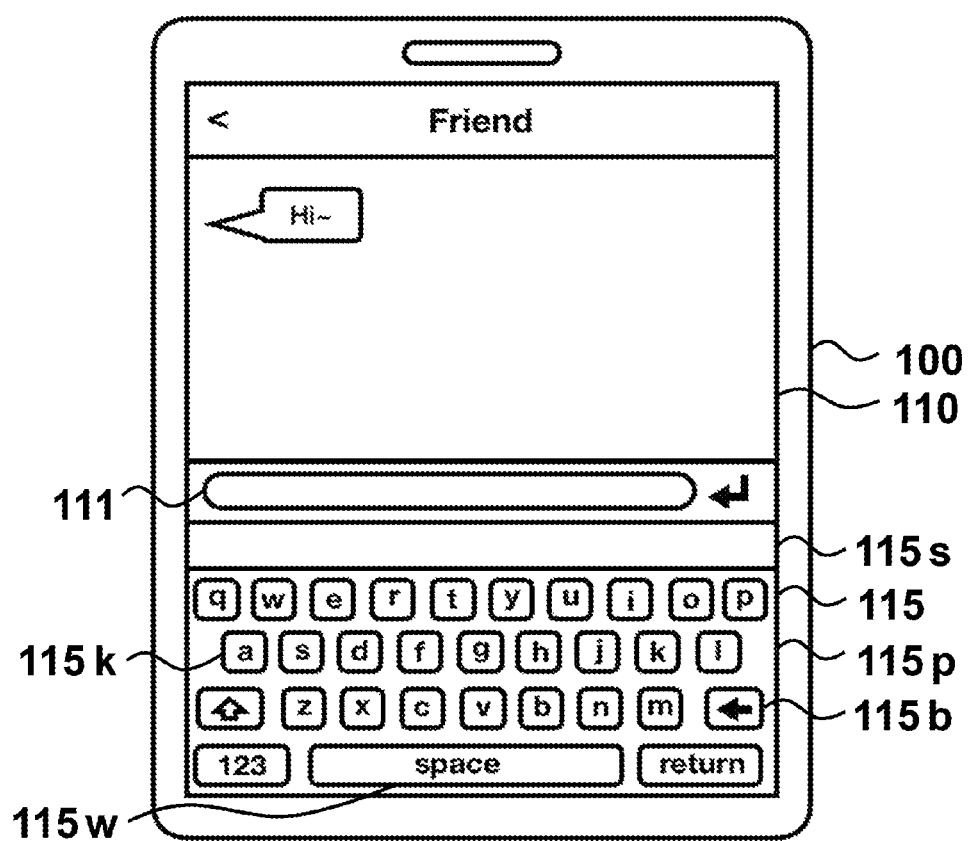
FIGS. 2-4 are exemplary diagrams respectively illustrating a device in which technologies for inputting characters may be implemented according to embodiments of the present disclosure.
Figure 3:
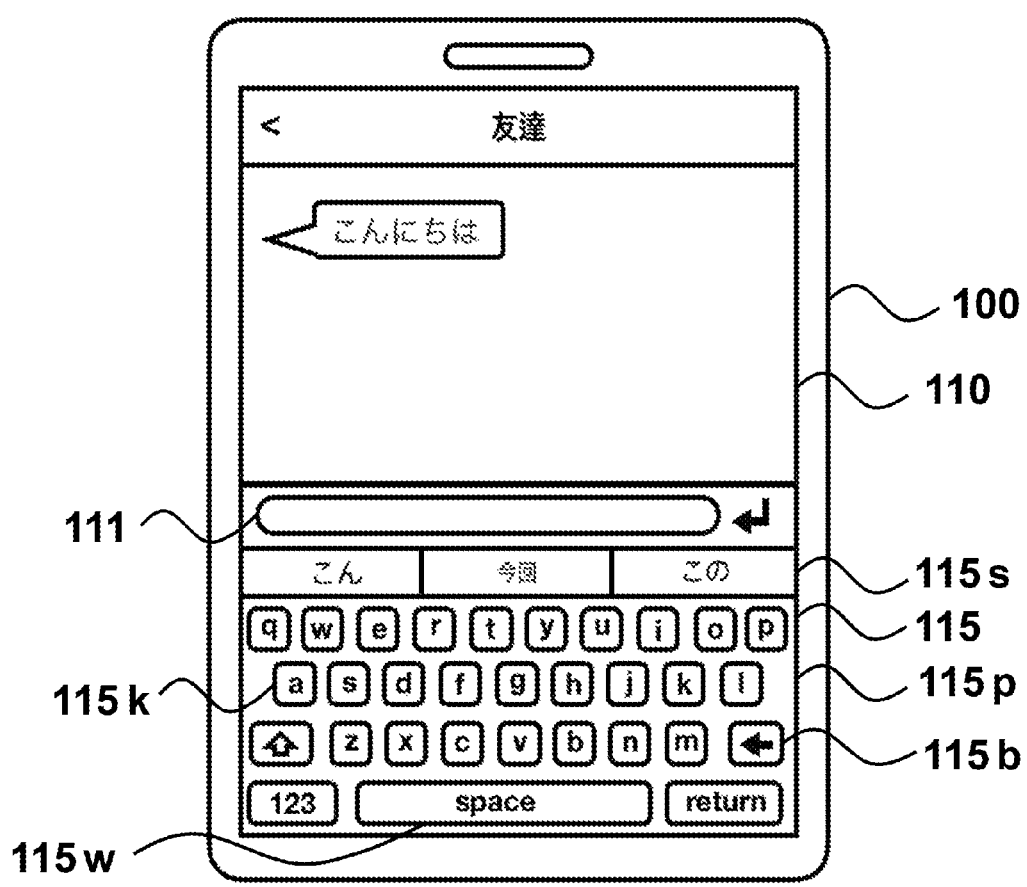
Figure 4:
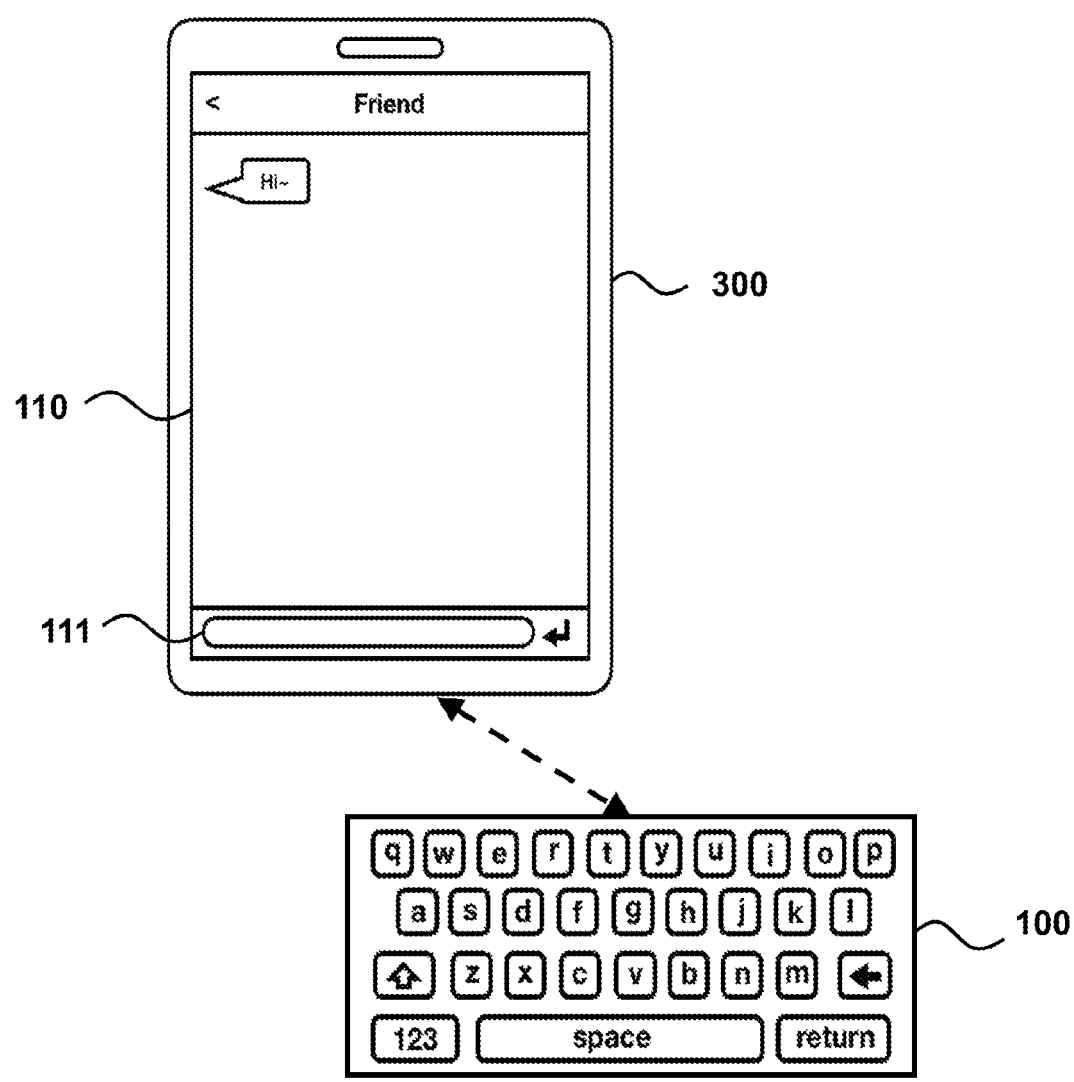

FIG. 1 is a block diagram illustrating the configuration of a device in which technologies for inputting characters may be implemented according to embodiments of the present disclosure. FIGS. 2-4 are exemplary diagrams respectively illustrating a device in which technologies for inputting characters may be implemented according to embodiments of the present disclosure.

Referring to FIG. 1, a device 100, in which technologies for inputting characters according to embodiments of the present disclosure may be implemented, includes a key input unit 10 and a control unit 20. In accordance with embodiments, the device 100 may further include a display unit 30, a wired and/or wireless connection unit 40, and the like.

The key input unit 10 is a unit, on which a key input for a character(s) inputted from a user is provided. The key input from a user may include inputs by physical and direct contact(s) on the key input unit 10. Additionally or alternatively, the key input from a user may include indirect inputs by which the key input is provided using distinct intermediate devices/modules or wired and/or wireless connections including optical media, electrical media, electronic media, or a combination thereof, so that indirect inputs have substantially the same effect as the physical input on the key input unit 10.

The control unit 20 may be configured to provide a result value (e.g., one or more Unicode characters) based on the key input which is inputted from a user using the key input unit 10, to an interface object in which the result value is to be inputted (e.g. a text input area displayed on a screen, as will be discussed below).

Although the device 100 is illustrated as a mobile device in FIG. 2 and FIG. 3, the device is not limited thereto which may implement technologies for inputting characters according to embodiments of the present disclosure. The device 100 may be any electronic device which is configured to receive a key input(s) from a user, and to provide an interface object with a result value (e.g., one or more Unicode characters) for the key input(s) inputted from the user.

For example, the device 100 may be a computing device which includes e.g., one or more processors (not shown), a memory (not shown) in which executable instructions are stored. The processor and the memory may be configured to be operated as the control unit 20 of the device 100. For example, the computing device may include an electronic device such as a personal computer, a smartphone, a tablet computer, a laptop computer, a server, a main frame, a television, a game system, a portable digital assistant, a camera, a media player, a wired keyboard, a wireless keyboard, etc., but it is not limited thereto. For example, if the device 100 is implemented as a server which includes a processor, a memory, and a connection unit, the key input unit 10 may be implemented as a hardware component, a software component, or a combination thereof configured to receive a key input(s) from a user via wired and/or wireless connection using the connection unit.

The key input unit 10 in the device 100 may be implemented to include various types of optical elements, electrical elements, electronic elements, or a combination thereof. For example, if the device 100 includes a touch screen as illustrated in FIG. 2 and FIG. 3, the touch screen may be configured to be operated as the key input unit 10. In this case, a key input(s) from a user may be provided using a key arrangement of a keyboard display 115 displayed on the touch screen.

In an embodiment, the device 100 may include a distinct input unit (e.g., a keyboard, a mouse, etc. which is not shown) for receiving a key input from a user via wired and/or wireless connection. In an embodiment, the device 100 itself may be implemented in a form of an input device such as a keyboard, which may be connected to an external display device 300 via wired and/or wireless connection as illustrated in FIG. 4. In this case, the device 100 may further include a connection unit (see 40 in FIG. 1) for the wired and/or wireless connection.

In an embodiment, the device 100 may further include a display unit 30 for displaying a key input(s) inputted from a user using the key input unit 10. In an embodiment, as illustrated in FIG. 4, the device 100 may be configured to be connected, via wired and/or wireless connection, to an external display device 300 for displaying a key input(s) inputted from a user using the key input unit 10. In this case, the display unit 30 of the device 100 or the external display device 300 may be configured to display a text input area 111 which will be described below.

The device 100 may be configured to provide, in the text input area 111, a result value based on a key input(s) (e.g., one or more Unicode characters) from a user.

For example, as illustrated in FIGS. 1 to 3, if the device 100 is implemented as a smartphone which includes the key input unit 10, the control unit 20, and the display unit 30, the device 100 may be configured, in response to a key input(s) inputted from a user using the key input unit 10, to provide a desired result value (e.g., one or more Unicode characters) in the text input area 111 of the display unit 30 under a control of the control unit 20.

For example, as illustrated in FIG. 1 and FIG. 4, if the device 100 is implemented as a wireless keyboard which includes the key input unit 10, the control unit 20, and the wireless connection unit 40, and if the wireless keyboard is connected to the external display device 300 which displays a text input area 111, the device 100 may be configured to provide the external display device 300 (in particular, in the text input area 111) with a key input(s) inputted from a user using the key input unit 10, via the wireless connection unit 40 under a control of the control unit 20. In this case, the key input(s) from a user may be provided using a key arrangement of the wireless keyboard.

For example, if the device 100 is implemented as a server which includes the key input unit 10, the control unit 20, and the wired/wireless connection unit 40 as illustrated in FIG. 1, and if the server is connected by wired and/or wireless connection to the external display device 300 which displays a text input area 111, the device 100 may be configured: to receive a key input(s) from a user provided from the external display device 300 via the wired/wireless connection unit 40, to determine, by the control unit 20, a result value (e.g., one or more Unicode characters) corresponding to the key input(s), and to provide the result value to the external display device 300 via the wired/wireless connection unit 40 again. Thus, the external display device 300 may display the result value in the text input area 111. In this case, the key input unit 10 of the device 100 may be implemented in forms of software elements such as functional elements, modules, or the like, which are operated by the control unit 20 and/or the wired/wireless connection unit 40.

Referring to FIGS. 2 to 4, the display unit 30 of the device 100 or the external display device 300 connected to the device 100 may be configured to display a desired display screen 110. In the display screen 110, various interface objects such as text, figures, graphical objects and the like may be displayed. For example, the interface objects may include a graphical user interface (GUI) object, a command line interface (CLI) object, or the like. In addition, the interface objects may include the text input area 111.

In an embodiment, if the device 100 includes the wired/wireless connection unit 40, the device 100 may be configured to be connected to a remote server via network so that the device 100 may download a desired application or program instructions therefrom, or install it on the device 100. If the application or the program instructions installed on the device 100 are executed, the device 100 may be configured to perform operations such as e.g., configuring a desired display screen, inputting data, transmitting and/or receiving data, and storing data.

In an embodiment, referring to FIG. 2 and FIG. 3, if the device 100 includes the display unit 30, the device 100 may be configured to display, on the display screen 110, a text input area 111 in which text may be inputted. Alternatively, referring to FIG. 4, the external display device 300 connected to the device 100 may be configured to display a text input area 111 on a display screen 110.

For example, the text input area 111 may be a message input window of a messenger application. For example, the text input area 111 may be a message input window of an SNS application. However, the text input area 111 is not limited thereto. In other words, the text input area 111 may be any interface object which causes text to be inputted from a user using the key input unit 10 of the device 100 and displayed on the display screen 110 of the device 100 or that of the external display device 300.

In the text input area 111, a plurality of language characters may be inputted. For example, English alphabet capital letters, English alphabet small letters, or a combination thereof may be inputted in the text input area 111. However, the language characters which may be inputted in the text input area 111 are not limited thereto. For example, various language characters may be inputted in the text input area 111 such as German alphabet, Russian alphabet, Spanish alphabet, Portuguese alphabet, Dutch alphabet, Swedish alphabet, Greek alphabet, Thai alphabet, Arabic alphabet, Korean Hangul, Hiragana, Katakana, simplified Chinese, Japanese Kanji, traditional Chinese, or the like. Based on a key input(s) from a user, language characters in a country may be inputted, or language characters in more than one country may be inputted together in the text input area 111.

In addition, Unicode characters other than language characters may be inputted in the text input area 111.

Unicode is an industrial standard code system which has been introduced to consistently represent characters all over the world. Unicode characters include various characters such as numbers, phonetic symbols, symbols, or the like as well as language characters (letters). Unicode may be implemented based on various encoding schemes such as e.g., UTF-8, UTF-16, and UTF-32. For example, UTF-16 encoding scheme is a scheme which represents a Unicode character in at least sixteen bits.

In general, if a text processing is performed in a computing system, Unicode serves to provide a unique code point, i.e., a code value, for each character. In this case, Unicode determines as to which code point is to be represented as a character while visual rendering (in sizes, fonts, styles, etc.) of the character may be typically determined by an application (a web browser, a document editing program, a messenger application, an SNS application, etc.). For example, a Unicode U+0041 represents a Basic Latin alphabet capital letter 'A' (hereinafter, 'U+' followed by a number means a hexadecimal representation of a Unicode code point). In this case, in which size, which font, and what color the capital letter 'A' would be represented may be determined by the application in which the Unicode character is text-processed (i.e., inputted, edited, etc.).

Unicode defines 1,114,112 code points in a range from U+0000 to U+10FFFF. In this way, Unicode defines a code space which consists of 1,114,112 code points. The code space includes a total of 17 code planes from $0_{hex}$ to $10_{hex}$ corresponding to the 4-th or higher order number in hexadecimal representation of code points. For example, code points in a range from U+0000 to U+FFFF belong to the basic multilingual plane (BMP) which is the first plane (plane zero). Code points in the BMP include almost all modern language characters which are most frequently used.

The code plane consisting of the code space of Unicode may be subdivided by blocks. A block is defined by a group of consecutive code points in a code plane. Some blocks may be entitled, while other blocks may not yet. For example, code points in a range from U+0000 to U+007F may be grouped as a Basic Latin block. For example, code points in a range from U+2580 to U+259F may be grouped as a block of Block Elements, having block shapes. For example, code points in a range from U+25A0 to U+25FF may be grouped as a block of Geometric Shapes. In this way, Unicode characters belonging to various Unicode blocks may be inputted in the text input area 111 of the device 100 or that of the external display device 300.

Meanwhile, the text input area 111 is a region in which more than one text line may be inputted. For example, if a newline character (text line delimiter such as a carriage return, a line feed, etc.) is inputted in the text input area 111, text may be displayed over different text lines. If text is displayed over different text lines, a character inputted before the newline character may be displayed in different text line from that after the newline character.

Additionally or alternatively, text may be displayed over different text lines if the number of characters inputted in the text input area 111 exceeds the number of characters which may be represented within a transverse length of the text input area 111.

In an embodiment, referring to FIG. 2 and FIG. 3, the device 100 may be configured, optionally, to further display a keyboard area 115 which is distinct from the text input area 111 on the display screen 110. In the keyboard area 115, a plurality of keys 115k may be arranged corresponding to characters in various languages. For example, keys corresponding to English alphabet may be arranged in the keyboard area 115. However, language characters to which keys 115k correspond are not limited thereto, which may be displayed in the keyboard area 115. For example, keys 115k may be displayed in the keyboard area 115, corresponding to various language characters such as English alphabet, German alphabet, Russian alphabet, Spanish alphabet, Portuguese alphabet, Dutch alphabet, Swedish alphabet, Greek alphabet, Thai alphabet, Arabic alphabet, Korean Hangul, Hiragana, Katakana, simplified Chinese, Japanese Kanji, traditional Chinese, or the like.

Keys 115k displayed in the keyboard area 115, corresponding to language characters, may be included in a primary key arrangement 115p or a supplementary key arrangement 115s. The primary key arrangement 115p means a key arrangement displayed in the keyboard area 115 at first, regardless of a key input(s) from a user, while the supplementary key arrangement 115s means a key arrangement which is displayed in response to input(s) from a user on a key(s) in the primary key arrangement.

For example, as illustrated in FIG. 3, if a key arrangement for inputting Japanese characters in Romanization is displayed in the keyboard area 115, English alphabet characters may be displayed in the primary key arrangement 115p, while Hiragana, Katakana, Japanese Kanji, or the like may be displayed in the supplementary key arrangement 115s corresponding to pronunciation of user-inputted English alphabet characters. For example, if a key arrangement for inputting simplified Chinese in Romanization is displayed in the keyboard area 115, English alphabet characters may be displayed in the primary key arrangement 115p, while simplified Chinese characters (not shown) may be displayed in the supplementary key arrangement 115p corresponding to pronunciation of user-inputted English alphabet characters. In accordance with embodiments, either the primary key arrangement 115p may be displayed in the keyboard area 115, or the primary key arrangement 115p may be displayed with the supplementary key arrangement 115s simultaneously, or the supplementary key arrangement 115s may be displayed after the primary key arrangement 115p is displayed at first. Unless stated otherwise in the description, it is to be understood that all the cases (i.e., in cases the supplementary key arrangement 115s is further displayed) are considered for the key arrangement.

In an embodiment, the keyboard area 115 may include a preview area which further displays a language character inputted from a user while the keyboard area 115 displays an arrangement of a plurality of keys 115k corresponding to language characters. In the preview area, a language character corresponding to a key inputted from a user may be sequentially displayed in an input order. For example, if a user inputs English alphabet capital 'A', English alphabet small 'p', and English alphabet small 'p', then 'App' which is the result of sequentially arranged characters corresponding to each key input, may be displayed in the preview area.

In accordance with embodiments, the preview area may substantially coincide with one of keys displayed in the supplementary key arrangement 115s. For example, as illustrated in FIG. 3, if a key arrangement for inputting Japanese characters in Romanization is displayed in the keyboard area 115, one of the keys displayed in the supplementary key arrangement 115s in response to a key input(s) in the primary key arrangement 115p may coincide with the preview area.

Figure 5:
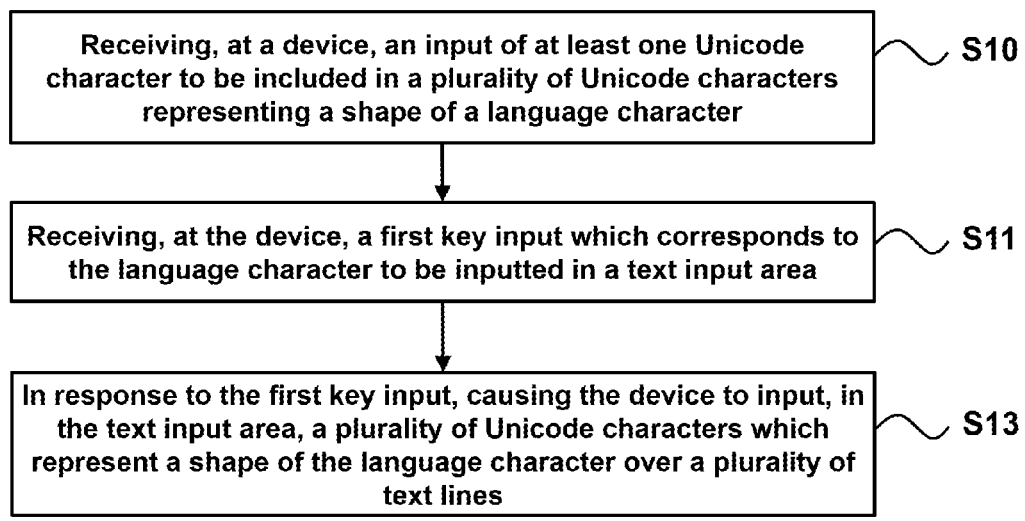
FIG. 5 is a flow chart illustrating a method for inputting characters according to an embodiment of the present disclosure.

FIG. 5 is a flow chart illustrating a method for inputting characters according to an embodiment of the present disclosure.

Referring to FIG. 5, a method for inputting characters according to an embodiment includes receiving, at a device, a first key input which corresponds to a language character (step S11), and causing the device to input, in a text input area, a plurality of Unicode characters which represents a shape of the language character over a plurality of text lines (step S13).

In step S11, a first key input corresponding to a language character may be inputted in the device. The first key input corresponding to the language character may be a single key input, or more than one key input. For example, if the language character is an English alphabet character, the first key input may be a key input for a key corresponding to the English alphabet character. Alternatively, the first key input may include one or more key inputs for keys from English alphabet characters, and an additional key input for a key from Hiragana, Katakana, and Japanese Kanji in the subsequent supplementary key arrangement. That is, depending on language characters by country, a single key input in the primary key arrangement may be sufficient for inputting one language character, or more than one key inputs in the primary key arrangement may be required, or a key input in the supplementary key arrangement with key inputs in the primary key arrangement may be required.

In step S13, in response to the first key input, the device may be caused to input, in the text input area, a plurality of Unicode characters which represents a shape of the language character over a plurality of text lines. The plurality of Unicode characters representing a shape of the language character over the plurality of text lines are Unicode characters, in part or as a whole, representing a shape of the language character over a number of text lines based on the first key input.

Figure 6:
FIGS. 6 and 7 are exemplary diagrams respectively illustrating Unicode characters which may be inputted in step S13 of a method for inputting characters illustrated in FIG. 5 according to an embodiment of the present disclosure.
Figure 7:
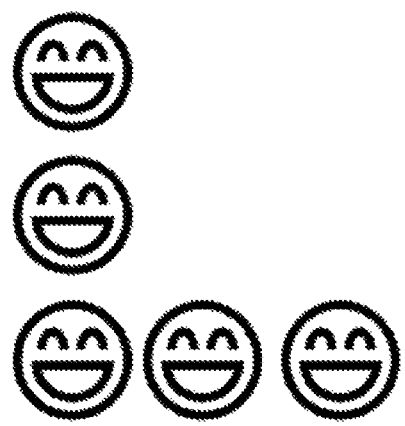

FIGS. 6 and 7 are exemplary diagrams respectively illustrating Unicode characters which may be inputted in step S13 of a method for inputting characters illustrated in FIG. 5 according to an embodiment of the present disclosure. For example, if the language character corresponding to the first key input is e.g., alphabet then a plurality of Unicode characters predetermined for the language character 'L' may include for example, as illustrated in FIG. 6, a plurality of Unicode code point U+2588 characters (i.e., a code point corresponding to a full-block shape). In this case, if these U+2588 characters are inputted along with suitable newline characters and/or spacing characters, they may be inputted in the text input area 111 so that the characters, in part or as a whole, represent a shape of the alphabet 'L' letter. Although Unicode code point U+2588 characters have been illustrated to represent a shape of alphabet 'L' over three text lines in FIG. 6, it is illustrative, and one skilled in the art should understand that a shape of alphabet 'L' may be represented in a variety of shapes such as a hollow shape, an embossed shape, a 3-dimensional shape, or the like, by setting another Unicode characters to be inputted over a plurality of text lines as illustrated in FIG. 7.

Thus, for example, if an alphabet capital letter 'L' is inputted as a key input in step S11, the device 100 is configured to input, in step S13, a plurality of Unicode characters, instead of inputting a single Unicode code point U+004C character which corresponds to that capital letter. Also, those Unicode characters inputted in this step may represent a shape of alphabet capital letter 'L' over a number of text lines. In an embodiment, those Unicode characters inputted in this step may be pre-matched with an alphabet capital letter 'L' key in a key arrangement included in the keyboard area 120, or may be stored in advance in a memory storage (not shown) included in the device 100, so that those Unicode characters represent a shape of alphabet capital letter 'L' over a number of text lines.

Meanwhile, although not illustrated, if a second key input from a user for a second language character, which is to be inputted following the first language character, is further inputted in the device after step S13, a plurality of Unicode characters representing a shape of the second language character over a plurality of text lines may be inputted, in the text input area 111, following the plurality of Unicode characters which represents a shape of the first language character. In this case, the plurality of text lines in which the plurality of Unicode characters are inputted based on the first key input may at least partially coincide with the plurality of text lines in which the plurality of Unicode characters are inputted based on the second key input. For example, if the plurality of Unicode characters are inputted in three text lines based on the first key input, the plurality of Unicode characters may be inputted based on the second key input in e.g., two text lines which coincide with text lines of the three text lines.

For example, if a capital 'L' letter is inputted as a first key input and a small 'b' letter is inputted as a second key input in the device 100, a suitable spacing character(s) (e.g., U+0020) may follow the Unicode characters representing the alphabet capital 'L' letter in each text line, and then Unicode characters representing the alphabet small 'b' letter may be inputted in the text input area 111. And the text lines in which the Unicode characters are inputted to represent the 'L' letter may coincide with the text lines in which the Unicode characters are inputted to represent the 'b' letter. That is, after the Unicode characters representing the alphabet capital 'L' letter, suitable spaces may be concatenated in each text line, and then the Unicode characters representing the alphabet small 'b' letter in e.g., three text lines may be concatenated. In this case, according to embodiments, the device 100 may be configured so that language characters based on the first key input and the second key input (i.e., 'Lb') are displayed in the preview area (e.g., see 115s in FIG. 3) at first, and that a plurality of Unicode characters representing a shape of the language characters based on the first and second key inputs are inputted in the text input area 111 after a final input of selection is further inputted on the preview display (i.e., a key in the supplementary key arrangement).

Meanwhile, a text input position 111c for inputting characters, at which characters may be inputted, may be displayed in the text input area 111. The text input position 111c for inputting characters may be displayed as a bar which flickers at regular intervals (see 111c in FIG. 8), but it is not limited thereto. Here, the plurality of Unicode characters which represents a shape of the language character over a plurality of text lines may be inputted in at least two text lines of text lines from m-th line above the text input position 111c to n-th line below the text input position 111c. Here, each of m and n is an integer equal to or greater than zero, and e.g., equal to or less than 50, while the sum of m and n is equal to or greater than one. In the phrase 'from m-th line above and to n-th line below' mentioned in the description, it is to be understood that the text line from zero-th line above or to zero-th line below, which refers to the text line when m or n is zero, means the very text line in which the text input position 111c is placed (see 153 in FIG. 8). For example, when m is zero and n is 2, exemplary implementations before and after the Unicode characters are inputted in the text input area 111, which represents 'L' letter in FIG. 6, are illustrated in FIGS. 8 and 9, respectively.

Figure 8:
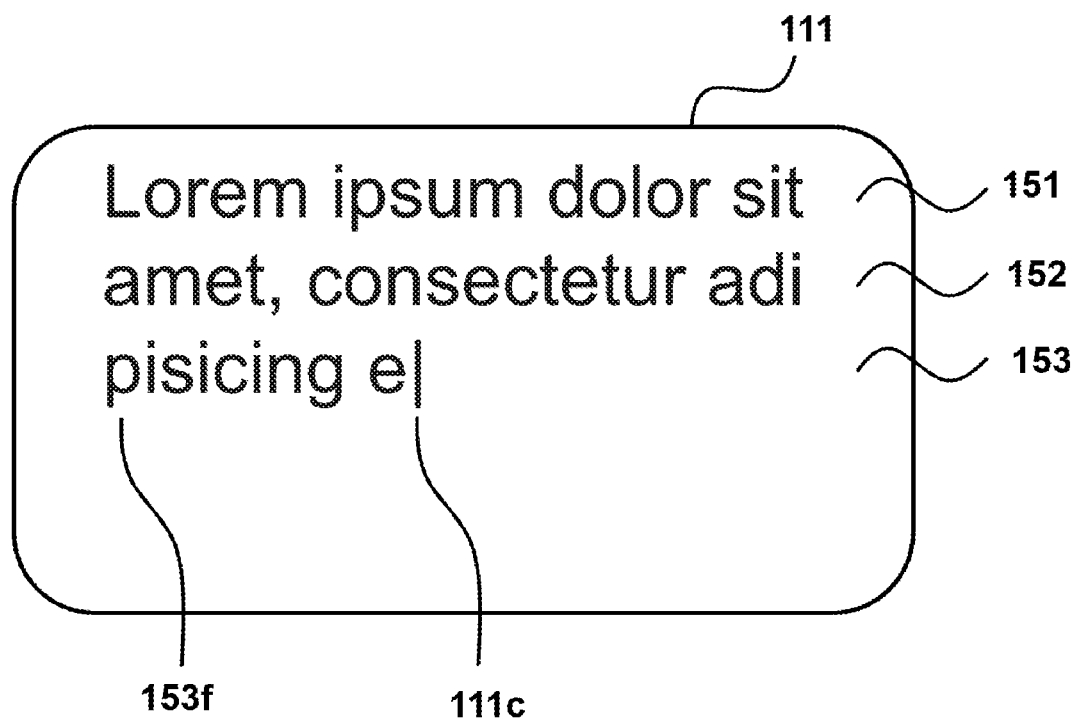
FIG. 8 is a diagram illustrating a text input area before a plurality of Unicode characters are inputted in a method for inputting characters according to an embodiment of the present disclosure.

FIG. 8 is a diagram illustrating a text input area before a plurality of Unicode characters are inputted in a method for inputting characters according to an embodiment of the present disclosure. FIGS. 9-13 are diagrams respectively illustrating text input areas after a plurality of Unicode characters are inputted in a method of inputting characters according to embodiments of the present disclosure. In FIG. 8 and below, each of text lines in the text input area 111 are referred to reference numerals 151, 152, 152a, 152b, 153, 154, 155, 156, and 157.

Figure 9:
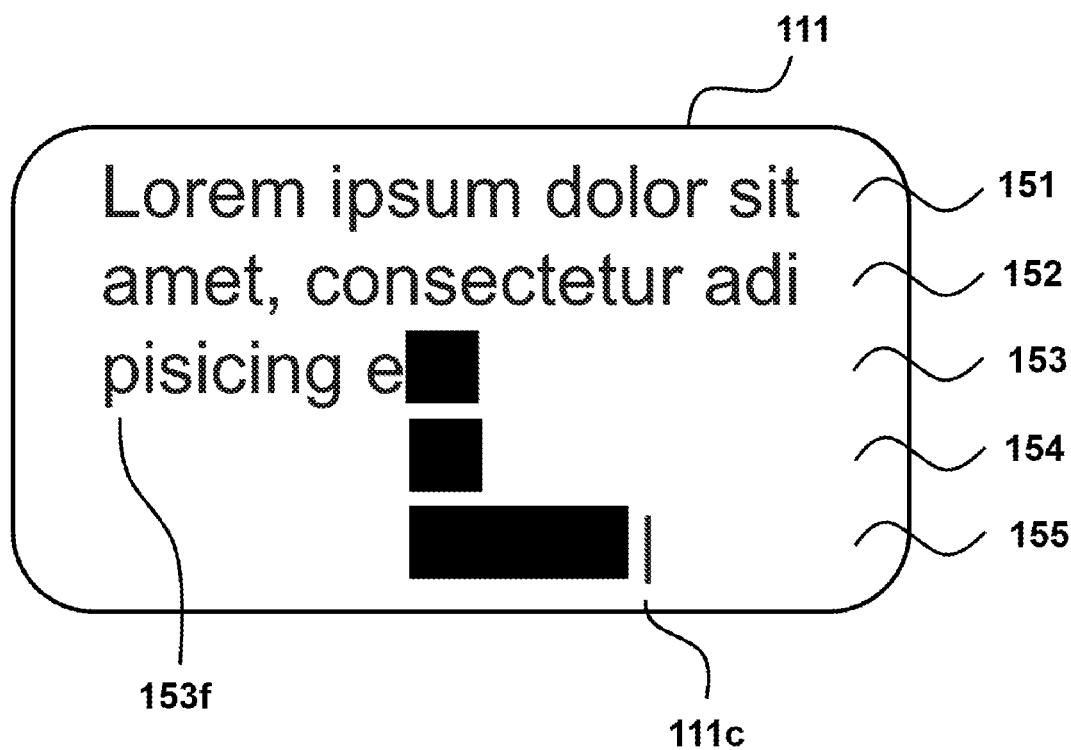
FIGS. 9-13 are diagrams respectively illustrating a text input area after a plurality of Unicode characters are inputted in a method of inputting characters according to an embodiment of the present disclosure.

Referring to FIGS. 8 and 9, in step S13 of a method according to an embodiment of the present disclosure, a plurality of Unicode characters U+2588's may be inputted in the text input area 111 over text lines e.g., from the text line 153 in which the text input position 111c is placed, to the text line 155 positioned two lines below the text line 153. The plurality of Unicode characters may be inputted with an appropriate newline character(s) and/or a spacing character(s) to represent a shape of an alphabet 'L' letter. For example, the plurality of Unicode characters may be inputted at the text input position 111c in the text line 153 in FIG. 9 in such a manner that a Unicode character U+2588 followed by a newline character U+000A are inputted at the text input position 111c, and then an appropriate number of spacing characters U+0020's followed by a Unicode character U+2588 and then followed by a newline character U+000A again are inputted, and then an appropriate number of spacing characters U+0020's followed by three Unicode characters U+2588's are inputted. This sequence of Unicode characters may be inputted in such a manner that, for example, individual Unicode characters are inputted sequentially one by one, or that a string in which the individual Unicode characters are consecutive is at least partially inputted.

Figure 10:
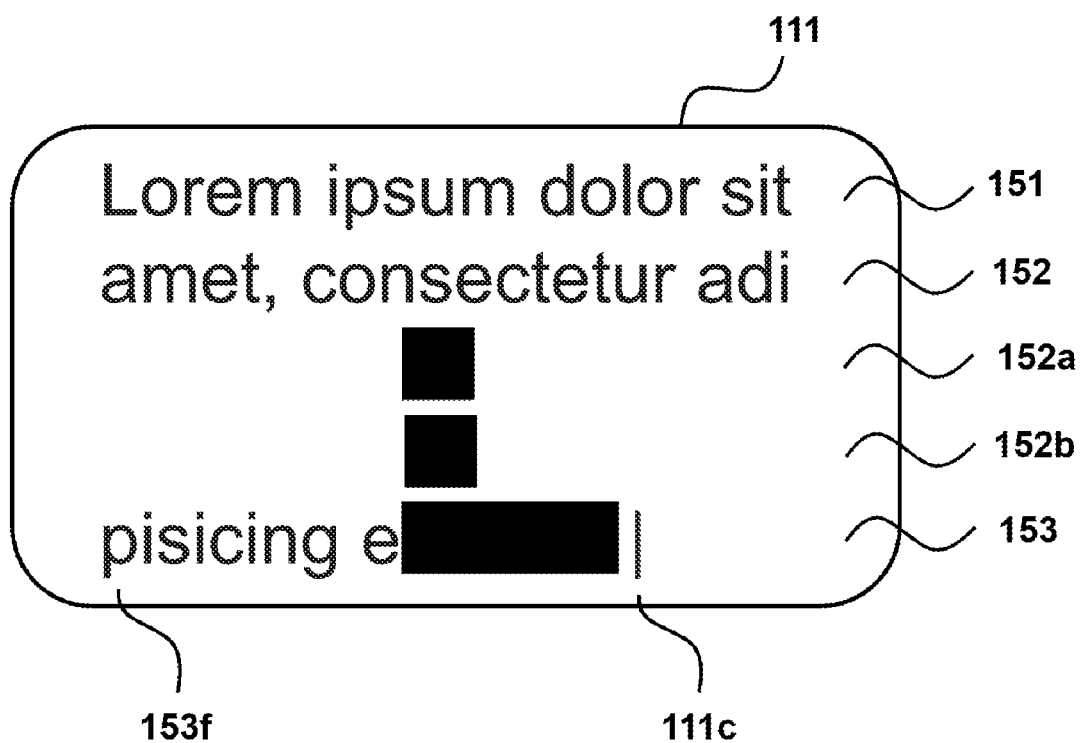

Referring to FIGS. 8 and 10, in step S13 of a method according to an embodiment of the present disclosure, a plurality of Unicode characters U+2588's may be inputted in the text input area 111 over text lines e.g., from the text line 153 in which the text input position 111c is placed, to the text line 152a positioned two lines above the text line 153. The plurality of Unicode characters may be inputted with an appropriate newline character(s) and/or a spacing character(s) to represent a shape of an alphabet 'L' letter. In this case, the plurality of Unicode characters may be inputted in such a manner that an appropriate Unicode characters like newline characters, spacing characters, etc. are inputted just before the leftmost character 153f in the text line 153 in which the text input position 111c is placed. For example, the plurality of Unicode characters may be inputted in such a manner that three Unicode characters U+2588's are inputted consecutively at the text input position 111c while an appropriate number of spacing characters U+0020's followed by a Unicode character U+2588 and then a newline character U+000A are inputted and then an appropriate number of spacing characters U+0020's followed by a Unicode character U+2588 and then a newline character U+000A again are inputted, before the leftmost character 153f in the text line 153 in which the text input position 111c is placed. In this way, by inputting a desired Unicode characters at an appropriate position before the text input position 111c (for example, at the leftmost position in the text line) as well as by inputting a desired Unicode characters at or after the text input position 111c, a shape of a language character may be further represented in text lines from m-th line above the text input position 111c, wherein each of m and n is an integer equal to or greater than zero and e.g., equal to or less than 50, and the sum of m and n is no less than one.

Figure 11:
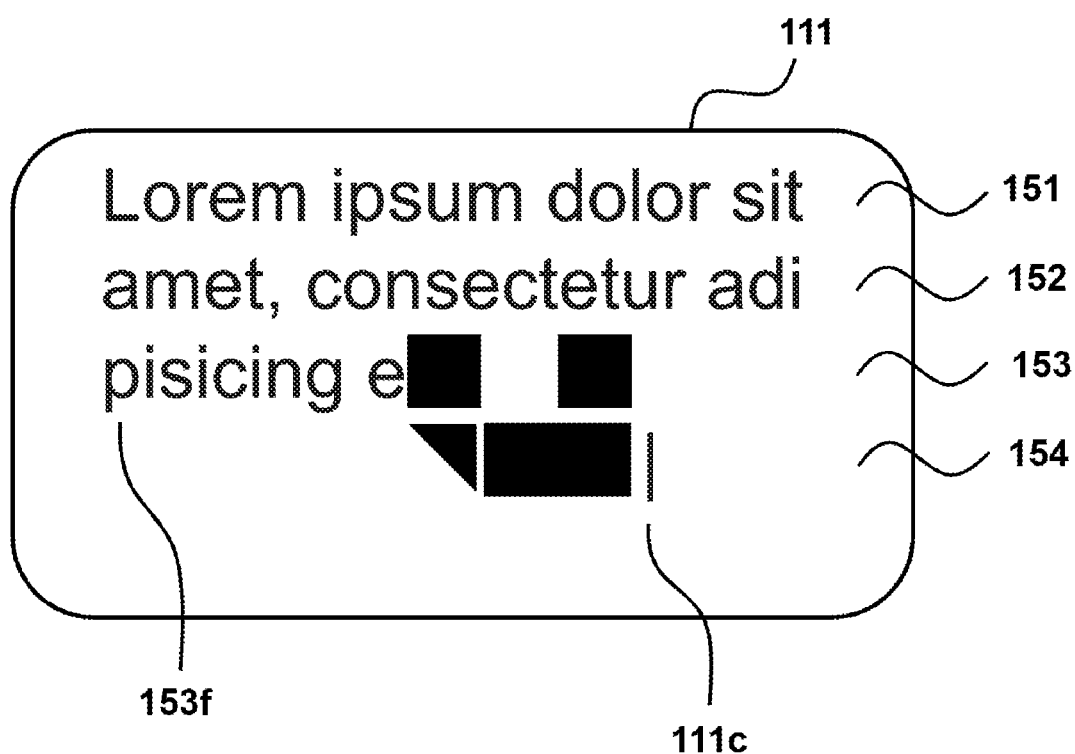

Referring to FIGS. 8 and 11, in step S13 of a method according to an embodiment of the present disclosure, a plurality of Unicode characters such as U+2588, U+25E2, U+25E3, U+25E4, U+25E5, and the like may be inputted over text lines from the text line 153 in which the text input position 111c is positioned, to the text line 154 one line below the text line 153 in the text input area 111. The plurality of Unicode characters may be inputted with an appropriate newline character(s) and/or a spacing character(s) to represent a shape of alphabet 'u' letter. For example, a Unicode character U+2588, an appropriate number of spacing characters U+0020's, a Unicode character U+2588, a newline character U+000A, an appropriate number of spacing characters U+0020's, a Unicode character U+25E5, and two Unicode characters U+2588's may be sequentially inputted so that a shape of alphabet 'u' may be represented over two text lines 153-154. Meanwhile, the text input position 111c may be set to be placed at any position after the plurality of Unicode characters are inputted to represent a shape of the language character. For example, in the text input area 111 in FIG. 11, the text input position 111c may be set to be placed in a variety of positions in such a manner that the text input position 111c is placed at the rightmost position in the text line 153 or at the rightmost position in the text line 154 after the Unicode characters representing a shape of alphabet 'u' are inputted.

As mentioned above, in response to a first key input from a user, the device 100 may be configured to input a plurality of Unicode characters so that a shape of a language character corresponding to the first key input may be represented over text lines from m-th line above the text input position 111c to n-th line below the text input position 111c (each of m and n is an integer equal to or greater than zero and e.g., equal to or less than 50, and the sum of m and n is no less than one) in the text input area 111.

Meanwhile, referring to FIG. 5 again, in a method for inputting characters according to an embodiment of the present disclosure, before e.g., step S13 or step S11, the method may further include step S10 of receiving, at the device 100, an input of at least one Unicode character to be included in the plurality of Unicode characters representing a shape of a language character. The input on the device 100 in step S10 may include an input e.g., in such a manner that the device 100 receives a selection input of one or more Unicode characters among a number of candidate Unicode characters which may be represented in the device 100 or the external display device 300. For example, if a selection input of U+2588 is provided from a user as a Unicode character to represent a shape of a language character, and for example, if an alphabet is inputted on the device as the first key input, the device may be configured so that the Unicode characters as in FIG. 6 are inputted in the text input area 111 to represent a shape of alphabet letter. On the other hand, if a selection input of U+1F604 is provided from a user as a Unicode character to represent a shape of a language character, and for example, if an alphabet is inputted on the device as the first key input, the device may be configured so that the Unicode characters as in FIG. 7 are inputted to represent a shape of alphabet 'L' letter.

Figure 12:
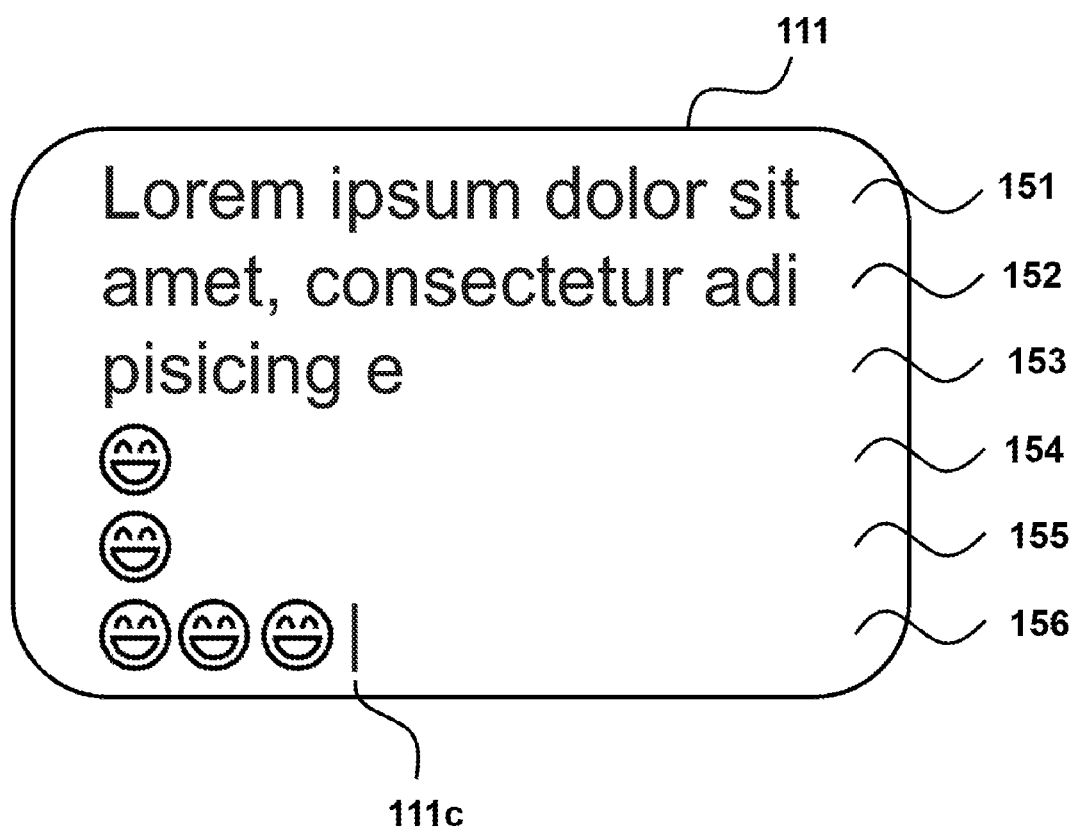

Referring to FIG. 8 and FIG. 12, according to an embodiment of the present disclosure, in step S13, for example, the device may be configured so that a plurality of Unicode characters U+1F604's are inputted with an appropriate number of newline characters and/or spacing characters over text lines from the text line 154, a line below the text line in which a text input position 111c is placed, to the text line 156, three lines below the text line in which the text input position 111c is placed, in the text input area 111. For example, the device may be configured so that a newline character U+000A, a Unicode character U+1F604, a newline character U+000A, a Unicode character U+1F604, a newline character U+000A, and three consecutive Unicode characters U+1F604's are inputted sequentially at the text input position 111c in FIG. 8 to represent a shape of alphabet 'L' letter over three text lines 154-156.

Figure 13:
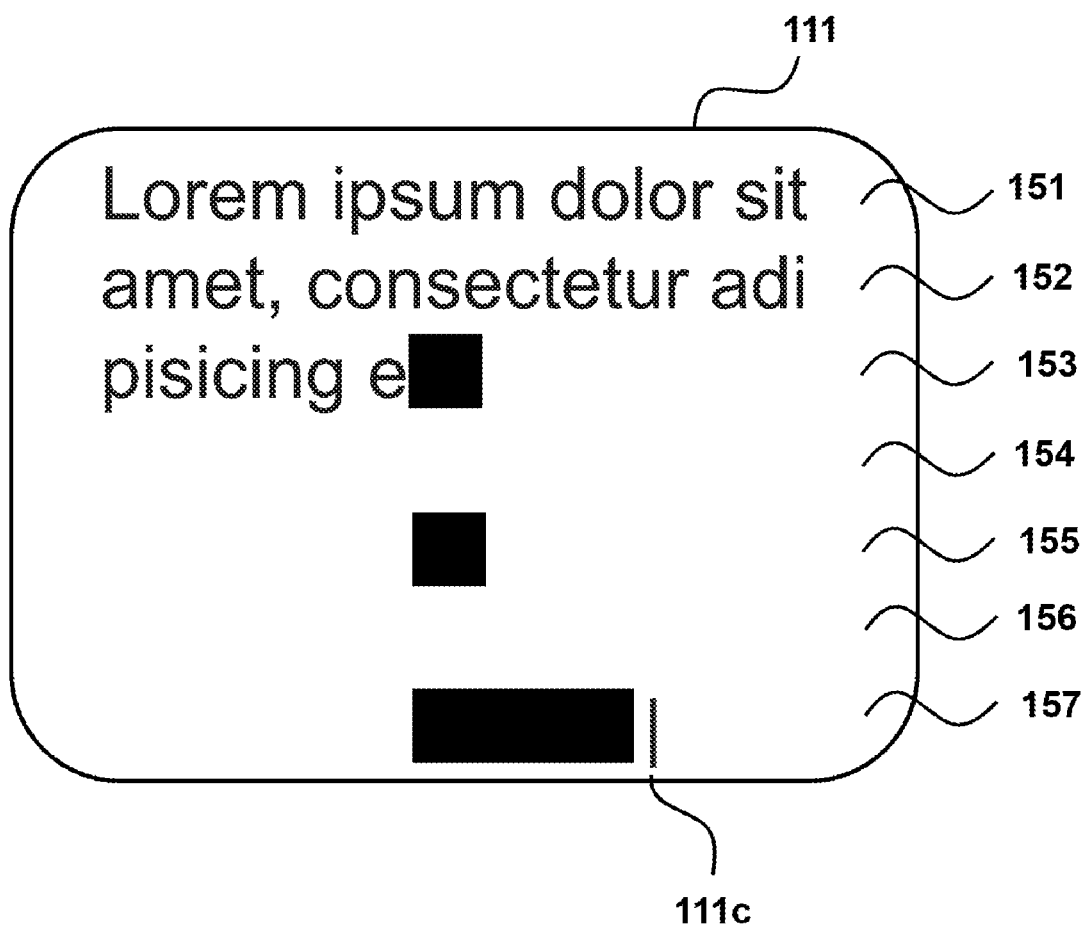

Referring to FIG. 8 and FIG. 13, according to an embodiment of the present disclosure, in step S13, for example, the device may be configured so that a plurality of Unicode characters U+2588's are inputted with an appropriate number of newline characters and/or spacing characters over text lines from the text line 153 in which a text input position 111c is placed, to the text line 157, four lines below the text line in which the text input position 111c is placed, in the text input area 111. Here, a shape of a language character represented by Unicode characters may be represented by inputting Unicode characters in non-consecutive text lines. For example, the device may be configured so that a Unicode character U+2588, a newline character U+000A, a newline character U+000A, an appropriate number of spacing characters U+0020's, a Unicode character U+2588, a newline character U+000A, a newline character U+000A, an appropriate number of spacing characters U+0020's, and three consecutive Unicode characters U+2588's are inputted sequentially at the text input position 111c in text line 153 in FIG. 8 to represent a shape of alphabet letter over five text lines 153-157.

Figure 14:
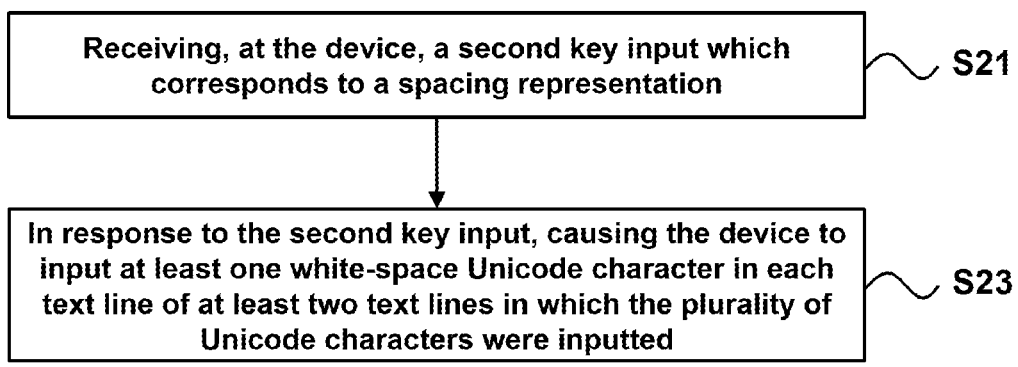
FIG. 14 is a flow chart illustrating steps which may be further included after step S13 in the method for inputting characters illustrated in FIG. 5 according to an embodiment of the present disclosure.

FIG. 14 is a flow chart illustrating steps which may be further included after step S13 in the method for inputting characters illustrated in FIG. 5 according to an embodiment of the present disclosure.

Referring to FIG. 14, the method for inputting characters according to an embodiment of the present disclosure may further include, after step S13 in FIG. 5, step S21 of receiving a second key input at the device wherein the second key input corresponds to a spacing representation, and step S23 of causing the device to input at least one white-space Unicode character in each text line of at least two text lines in which the plurality of Unicode characters were inputted, in response to the second key input.

For example, in step S21, a key input on a space key 115w in FIG. 2 corresponding to a spacing representation may be inputted at the device. Here, if the device 100 includes a touch screen, the key input corresponding to a spacing representation may include a key input on a certain key (e.g., a space key) in a key arrangement 115 displayed on the screen of the device 100. Alternatively, if the device 100 includes a distinct key input unit 10 such as a physical keyboard, etc., or if the device 100 is implemented in a form of a keyboard by itself, the key input corresponding to a spacing representation may include a key input on a certain key (e.g., a space key) included in these keyboards.

In step S23, in response to the key input from a user on the spacing key 115w, the device 100 may be configured to input one or more white-space Unicode characters in each text line of the text lines where the plurality of Unicode characters were inputted in step S13. For example, the white-space Unicode characters may be one or more Unicode characters representing white spaces such as spacing characters U+0009, U+0020, U+2000, or the like. For example, in step S23, white-space Unicode characters may be inputted one by one in each text line of the text lines (i.e., the text lines where the plurality of Unicode characters were inputted in step S13), or two or more white-space Unicode characters may be inputted in each text line of the text lines. Here, the two or more white-space Unicode characters may include a single white-space Unicode character which is repeated several times, or a variety of white-space Unicode characters having different code points.

For example, these white-space Unicode characters may be inputted in such a manner that the white-space Unicode characters are inserted at the position just before the newline character (e.g., U+000A) of the plurality of Unicode characters inputted in step S13. For example, if Unicode characters representing alphabet 'L' are inputted in step S13 as in FIG. 9, then in step S23, one or more white-space Unicode characters may be inputted e.g., in such a manner that white-space Unicode characters are further inserted at the positions just before the newline characters in text lines 153-154 and at the current text input position 111c. However, it is to be understood that it is not necessarily required to insert the white-space Unicode characters at the positions just before the newline characters, and one skilled in the art should understand that the white-space Unicode characters may be inserted at any positions if the positions are appropriately placed to represent a white space(s) before the newline character.

In an embodiment, to insert the white-space Unicode characters, the device 100 may determine, before step S23 or step S21, which characters or how many characters are placed in the entire character string in the text input area 111, or at least in a character string near (before and/or after) the text input position 111c. For example, the device 100 may be configured to determine the position at which white-space Unicode characters are to be inserted, by checking characters before or after the text input position 111c in the text input area 111 and then by determining where newline characters (e.g., U+000A) are placed.

Figure 15:
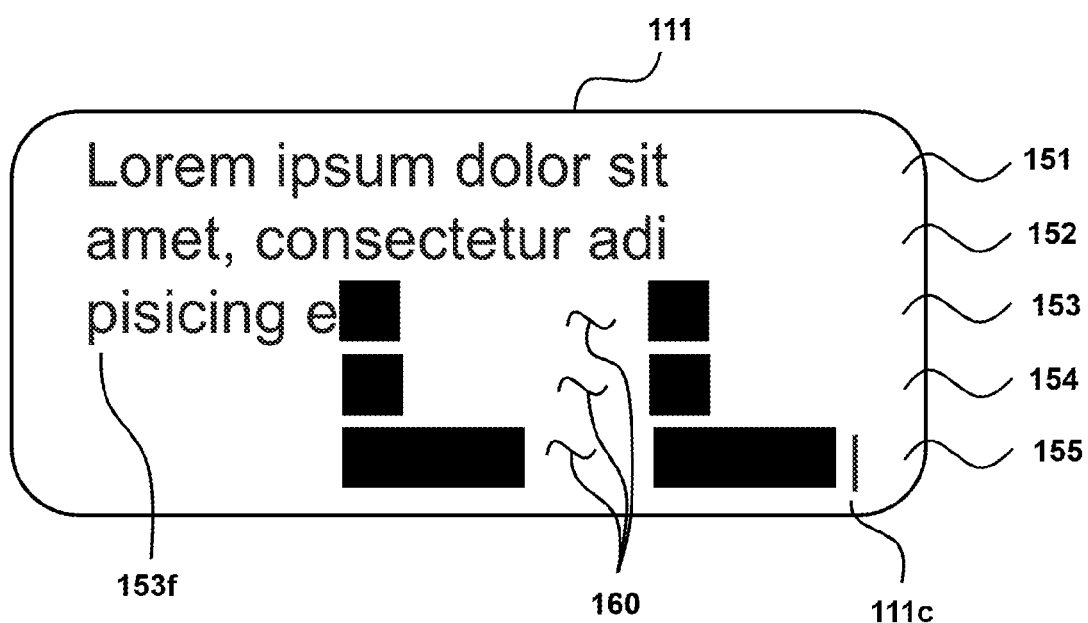
FIG. 15 is a diagram illustrating a text input area after step S23 is performed in the method for inputting characters illustrated in FIG. 14 according to an embodiment of the present disclosure.

FIG. 15 is a diagram illustrating a text input area after step S23 is performed in the method for inputting characters illustrated in FIG. 14 according to an embodiment of the present disclosure.

In FIG. 15, the text input area 111 is illustrated so that the plurality of Unicode characters representing alphabet 'L' are inputted in step S13, and then desired spacings 160 are represented by inputting white-space Unicode characters in step S23, and then a plurality of Unicode characters representing alphabet 'L' are inputted again in the text input area 111. Here, the spacings 160 may be implemented by one or more white-space Unicode characters in each text line of at least two or more text lines. By these spacings 160, white spaces between language characters (i.e., plurality of Unicode characters) represented over a plurality of text lines may be inputted in a similar manner that a white space is inputted between one character and another in a single text line.

Figure 16:
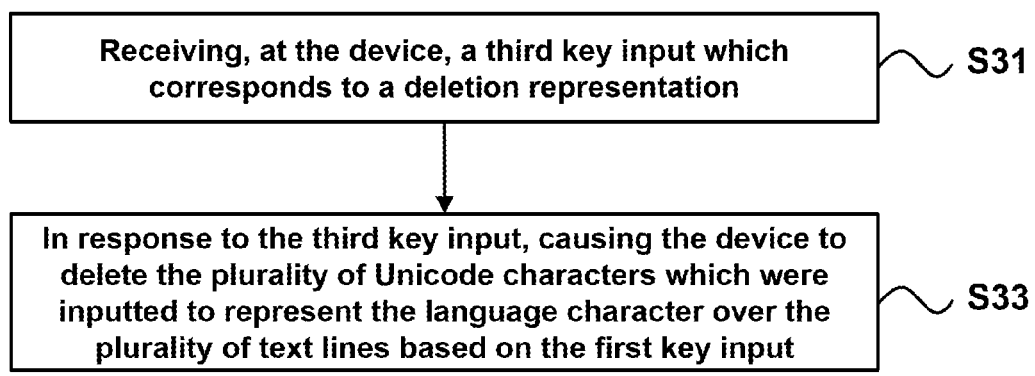
FIG. 16 is a flow chart illustrating steps which may be further included after step S13 in the method for inputting characters illustrated in FIG. 5 according to an embodiment of the present disclosure.

FIG. 16 is a flow chart illustrating steps which may be further included after step S13 in the method for inputting characters illustrated in FIG. 5 according to an embodiment of the present disclosure.

Referring to FIG. 16, a method for inputting characters according to an embodiment of the present disclosure may further include, after step S13 in FIG. 5, step S31 of receiving a third key input at the device wherein the third key input corresponds to a deletion representation, and step S33 of causing the device to delete the plurality of Unicode characters which were inputted to represent the language character based on the first key input over the plurality of text lines, in response to the third key input.

For example, in step S31, a key input on a backspace key 115b in FIG. 2 corresponding to a deletion representation may be inputted at the device. Here, if the device 100 includes a touch screen, the key input corresponding to a deletion representation may include a key input on a certain key (e.g., a backspace key) in a key arrangement 115 displayed on the screen. Alternatively, if the device 100 includes a distinct key input unit 10 such as a physical keyboard, etc., or if the device 100 is implemented in a form of a keyboard by itself, the key input corresponding to a deletion representation may include a key input on a certain key (e.g., a backspace key) included in the keyboard.

In step S33, in response to the key input from a user on the deletion key 115b, the device 100 may be configured to delete the plurality of Unicode characters which were inputted in each text line of the text lines based on a previous key input, wherein the plurality of Unicode characters were inputted in step S13. For example, if Unicode characters representing alphabet 'L' letter were inputted as in FIG. 9 before step S31, these Unicode characters representing alphabet 'L' letter may be deleted in step S33 so that characters remain as in FIG. 8 in the text input area 111.

For example, if Unicode characters representing alphabet 'L' letter were inputted twice with desired spacings 160 therebetween as in FIG. 15 before step S31, the Unicode characters previously inputted and representing alphabet 'L' letter may be deleted in step S33, and if a key input on the deletion key 115b is further inputted once more, white-space Unicode characters corresponding to spacings 160 may be further deleted so that characters remain as in FIG. 9 in the text input area 111.

The deletion of the previous Unicode characters may be performed e.g., by storing, in a desired variable(s) (e.g., a variable which stores character string indices) in advance, start positions and end positions of Unicode characters which represent alphabet 'L' letter at each text line, and then by repeatedly 'deleting previous one character' from the end positions to the start positions (i.e., conventional deletion operations of a backspace key or a delete key performed in key arrangements of a keyboard or a touch screen) at each text line based on the variable(s).

For example, a pseudo-code of a function to delete previous Unicode characters may be as follows:
Function deleteUnicodes
 Variable startIndexAtTextLines=[startIndexAtTextLine1, startIndexAtTextLine2, . . . ]
 Variable endIndexAtTextLines=[endIndexAtTextLine1, endIndexAtTextLine2, . . . ]
 Loop startIndexAtTextLines [eachLine] to endIndexAtTextLines [eachLine]
  deleteOneCharacter( )
 End Loop
End Function where startIndexAtTextLines and endIndexAtTextLines are variables respectively storing start positions and end positions of the plurality of Unicode characters previous inputted at each text line, which may have array types. Here, Loop denotes a repeated operation from start positions to end positions of the plurality of Unicode characters at each text line. Here, deleteOneCharacter( ) denotes a call of a function which performs conventional deletion operation of a backspace key or a delete key in key arrangements of a keyboard or a touch screen.

However, it is to be understood that the deletion of previous Unicode characters is not limited to the pseudo-code, and one skilled in the art may implement any different algorithms to delete previous Unicode characters. For example, in an embodiment, the deletion of previous Unicode characters may be performed e.g., by deleting all characters inputted in the text input area 111 and then re-inputting remaining characters other than the Unicode characters to be deleted.

As mentioned above, one skilled in the art should understand that each Unicode character mentioned in the embodiments of the present disclosure may be implemented as, e.g., a character type. Also, one skilled in the art should understand that a plurality of Unicode characters mentioned in the embodiments of the present disclosure may be implemented in various formats such as an array type of characters, a string type, or the like. However, it is to be understood that the implementation of a plurality of Unicode characters is not limited to types of an array or a string, and that any various data types may be used e.g., to store and/or refer to several Unicode characters implemented as character-based types.

As described above, according to embodiments of the present disclosure, a device may be used to represent various shapes of a letter inputted in a text input area over two or more text lines by a group of Unicode characters.

Also, a device may be used to represent various styles, forms, etc. of a letter inputted in a text input area over two or more text lines by a group of Unicode characters.

Further, a method for inputting a group of Unicode characters representing these various shapes of language characters may be configured to be applied to only one application, and additionally or alternatively, to be applied to any applications in which Unicode characters in the group of Unicode characters may be inputted.

For example, if the device 100 is implemented as a smartphone or tablet computer including a touch screen, a method for inputting characters according to an embodiment may be implemented in a form of a keyboard application extension program which may be applied to an independent application running on an operating system of the smartphone or the tablet computer. In this case, a method for inputting characters may be implemented e.g., as follows: if a desired request (e.g., a key input, etc.) is transmitted to the keyboard application extension program from a host application running on the device 100 by a system control program such as, e.g., an operating system or kernel of the device 100, then the keyboard application extension program performs a process for the request and transmits a result back to the host application. Thus, a method for inputting characters according to embodiments of the present disclosure may be implemented for any host applications to which the keyboard application extension program may be applied.

For example, if the device 100 is implemented as a smartphone or tablet computer including a touch screen, a method for inputting characters according to an embodiment may be implemented in a form of a system input interface module running on an operating system of the smartphone or the tablet computer. In this case, a method for inputting characters according to embodiments of the present disclosure may be implemented as an example of an optional keyboard interface module which is added on a conventional keyboard interface module running on the operating system.

For example, if the device 100 is implemented as a wired or wireless keyboard which may be connected to an external computing device (e.g., smartphone, personal computer) having a display, a method for inputting characters according to an embodiment may be implemented e.g., by responding to key inputs from a user so that the keyboard transmits the results (e.g., a plurality of Unicode characters corresponding to a key input value(s)) stored in a memory of the keyboard to the external computing device.

For example, if the device 100 is implemented as a server which may be connected, with wired or wireless connection, to an external computing device (e.g., smartphone, personal computer) having a display, a method for inputting characters according to an embodiment may be implemented e.g., by responding to key inputs from a user provided from the external computing device so that the server transmits the results (e.g., a plurality of Unicode characters corresponding to a key input value(s)) stored in a memory of the server back to the external computing device.

However, it is to be understood that the above-mentioned implementations are for the purpose of exemplary illustration only, and they are not intended to limit implementations of a method of inputting characters according to embodiments of the present disclosure. For example, devices and methods for inputting characters according to embodiments of the present disclosure may be implemented not only in a form of the above-mentioned computing devices but also, e.g., in a form of computer-executable instructions which may be stored in a variety of forms of computer-readable storage media and performed on a variety of computer systems. Also, a computer program according to embodiments of the present disclosure may be implemented in a form of an application for personal computers or mobile devices, or in a form of an application extension program. These applications may be installed on the device 100 with a file(s) provided from a file distribution system (not illustrated). In this case, the file distribution system may transmit the file including the program to the device 100 based on a request of the device 100.

The device described above may be implemented as hardware components, software components, or a combination thereof. In this case, the hardware component may be a processing apparatus including e.g., a processor, a controller, or a programmable logic unit. The processing apparatus may be configured to run an operating system (OS) and to execute one or more software applications on the operating system. The processing apparatus may be configured to access, store, manipulate, process, and generate data in response to an execution of the software application. One skilled in the art should understood that the processing apparatus may include a plurality of processing components.

The software component may include computer programs, codes, instructions, or one or more combination thereof. The software component may be configured for the processing apparatus to perform a desired operation, or the software component may be configured to command the processing apparatus independently or collectively to perform a desired operation. The software component may be embodied non-transitorily or temporarily in a certain type of a machine, an element, a physical device, a virtual device, or a storage medium in order to be interpreted by the processing apparatus, to command the processing apparatus, or to provide the processing apparatus with data. The software component may be stored or executed in a distributed way by distributing it on computer systems connected to each other in a network. The software component may be stored in one or more computer-readable storage media.

The invention claimed is:

1. A method for inputting characters capable of being performed in a device,
    wherein the device is configured to input characters in a text input area displayed on the device itself, or the device is configured to provide an external display device with characters for inputting in a text input area displayed on the external display device,
    wherein the text input area is configured so that characters are inputted in a plurality of text lines, a text input position at which characters are inputted is placed in the text input area, and the plurality of text lines consists of individual text lines,
    the method comprising:
    receiving a first key input, wherein the first key input corresponds to a first letter to be inputted in the text input area in which the text input positron is placed;
    providing, in response to the first key input, a first plurality of Unicode characters to be inputted in the text input area;
    receiving a second key input, wherein the second key input corresponds to a second letter to be inputted in the text input area in which the text input position is placed; and
    providing, in response to the second key input, a second plurality of Unicode characters to be inputted in the text input area,
    wherein the first plurality of Unicode characters and the second plurality of Unicode characters represent a shape of the first letter and a shape of the second letter, respectively, over at least two text lines of the plurality of text lines,
    wherein at least a first character among the second plurality of Unicode characters is concatenated, in a single text line of the at least two text lines, after a second character among the first plurality of Unicode characters without any text line delimiter between the first character and the second character.

2. The method for inputting characters of claim 1,
    wherein the at least two text lines of the plurality of text lines includes at least two text lines of text lines from m-th line above the text input position to n-th line below the text input position, and
    wherein each of m and n is an integer equal to or greater than zero, and equal to or less than 50, and the sum of m and n is equal to or greater than one.

3. The method for inputting characters of claim 2, wherein one of m and n is zero.

4. The method for inputting characters of claim 1, wherein the at least two text lines of the plurality of text lines include consecutive text lines.

5. The method for inputting characters of claim 1, wherein after the providing the first plurality of Unicode characters and before the receiving the second key input, the method further comprising:
    receiving a third key input, wherein the third key input corresponds to a spacing representation; and
    providing, in response to the third key input, white-space Unicode characters to be inputted in each of the text lines of the at least two text lines in which the first plurality of Unicode characters were inputted.

6. The method for inputting characters of claim 1, wherein after the providing the second plurality of Unicode characters, the method further comprising:
receiving a fourth key input, wherein the fourth key input corresponds to a deletion representation; and
deleting the second plurality of Unicode characters in response to the fourth key input, wherein the second plurality of Unicode characters to be deleted were inputted in the at least two text lines in response to the second key input.

7. The method for inputting characters of claim 1, wherein before the providing the first plurality of Unicode characters, the method further comprising:
receiving a fifth key input of at least one Unicode character to be included in the first plurality of Unicode characters representing the shape of the first letter.

8. The method for inputting characters of claim 1, wherein the device includes a touch screen, and
wherein the text input area is configured to be displayed on the touch screen.

9. The method for inputting characters of claim 1, wherein at least one white-space Unicode character is placed between the first character among the second plurality of Unicode characters and the second character among the first plurality of Unicode characters in the single text line.

10. The method for inputting characters of claim 1, wherein the first character among the second plurality of Unicode characters is concatenated after the second character among the first plurality of Unicode characters based on the text input position.

11. A computer-readable non-transitory storage medium in which computer-executable instructions are stored, wherein the computer-executable instructions are capable of being performed in a device,
wherein the device is configured to input characters in a text input area displayed on the device itself, or the device is configured to provide an external display device with characters for inputting in a text input area displayed on the external display device,
wherein the text input area is configured so that characters are inputted in a plurality of text lines, a text input position at which characters are inputted is placed in the text input area, and the plurality of text lines consists of individual text lines,
wherein the computer-executable instructions are configured to:
provide a first plurality of Unicode characters for inputting in the text input area in which the text input position is placed if a first key input is inputted, wherein the first key input corresponds to a first letter to be inputted in the text input area; and
provide a second plurality of Unicode characters for inputting in the text input area in which the text input position is placed if a second key input is inputted, wherein the second key input corresponds to a second letter to be inputted in the text input area,
wherein the first plurality of Unicode characters and the second plurality of Unicode characters represent a shape of the first letter and a shape of the second letter, respectively, over at least two text lines of the plurality of text lines,
wherein at least a first character among the second plurality of Unicode characters is concatenated, in a single text line of the at least two text lines, after a second character among the first plurality of Unicode characters without any text line delimiter between the first character and the second character.

12. The computer-readable non-transitory storage medium of claim 11, wherein the at least two text lines of the plurality of text lines include consecutive text lines.

13. The computer-readable non-transitory storage medium of claim 11, wherein the computer-executable instructions are further configured, after the providing the first plurality of Unicode characters and before the providing the second plurality of Unicode characters, to:
provide white-space Unicode characters to be inputted in each text line of the at least two text lines in which the first plurality of Unicode characters are inputted if a third key input is inputted,
wherein the third key input corresponds to a spacing representation.

14. The computer-readable non-transitory storage medium of claim 11, wherein the computer-executable instructions are further configured, after the providing the second plurality of Unicode characters, to:
delete the second plurality of Unicode characters if a fourth key input is inputted,
wherein the fourth key input corresponds to a deletion representation,
wherein the second plurality of Unicode characters to be deleted were inputted over the at least two text lines in response to the second key input.

15. The computer-readable non-transitory storage medium of claim 11,
wherein the at least two text lines of the plurality of text lines includes at least one of a first text line in which the text input position is placed, a second text line just above the first text line, and a third text line just below the first text line.

16. A device for inputting characters comprising:
a display unit configured to display a text input area in which characters are capable of being inputted in a plurality of text lines, wherein a text input position at which characters are inputted is placed in the text input area, and wherein the plurality of text lines consists of individual text lines;
a key input unit configured to receive a first key input and a second key input, wherein the first key input and the second key input correspond to a first letter and a second letter, respectively, to be inputted in the text input area in which the text input position is placed; and
a control unit configured to input a first plurality of Unicode characters and a second plurality of Unicode characters in the text input area in response to the first key input and the second key input, respectively,
wherein the first plurality of Unicode characters and the second plurality of Unicode characters represent a shape of the first letter and a shape of the second letter, respectively, over at least two text lines of the plurality of text lines,
wherein at least a first character among the second plurality of Unicode characters is concatenated, in a single text line of the at least two text lines, after a second character among the first plurality of Unicode characters without any text line delimiter between the first character and the second character.

17. The device for inputting characters of claim 16, wherein the at least two text lines of the plurality of text lines include consecutive text lines.

18. The device for inputting characters of claim 16, wherein the display unit includes a touch screen, and wherein the key input unit is configured to be displayed on the touch screen.

19. The device for inputting characters of claim 18, wherein the key input unit includes an arrangement of keys which display characters in a basic multilingual plane of Unicode.

20. The device for inputting characters of claim 18, wherein the key input unit includes an arrangement of keys which display alphabet letters.

\* \* \* \* \*

UNITED STATES PATENT AND TRADEMARK OFFICE
CERTIFICATE OF CORRECTION

PATENT NO.         : 11,132,497 B2
APPLICATION NO.    : 17/047691
DATED              : September 28, 2021
INVENTOR(S)        : Kim It is certified that error appears in the above-identified patent and that said Letters Patent is hereby corrected as shown below:

In the Claims

Correct the word "positron" in Column 18 Line 25 to "position".

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*